(12) United States Patent
Mestanek et al.

(10) Patent No.: US 11,628,540 B2
(45) Date of Patent: Apr. 18, 2023

(54) ABRASIVE HEADS WITH INSERTED JET

(71) Applicants: PTV, spol. s r. o., Hostivice (CZ);
Institute of Geonics of the CAS, Poruba (CZ)

(72) Inventors: Jiri Mestanek, Repy (CZ); Zdenek Riha, Kohoutovice (CZ)

(*) Notice: Subject to any disclaimer, the term of this patent is extended or adjusted under 35 U.S.C. 154(b) by 812 days.

(21) Appl. No.: 16/409,900

(22) Filed: May 13, 2019

(65) Prior Publication Data
US 2019/0366508 A1 Dec. 5, 2019

(30) Foreign Application Priority Data
May 15, 2018 (CZ) ................. CZ2018-226

(51) Int. Cl.
*B24C 5/04* (2006.01)
*B24C 1/04* (2006.01)
*B24C 7/00* (2006.01)

(52) U.S. Cl.
CPC ............. *B24C 5/04* (2013.01); *B24C 1/045* (2013.01); *B24C 7/0084* (2013.01)

(58) Field of Classification Search
CPC .. B24C 5/02; B24C 5/04; B24C 1/045; B24C 7/0007; B24C 7/0015; B24C 7/0023; B24C 7/0038; B24C 7/0084; B24C 3/12; B24C 3/22; B24C 3/28
USPC .............................................. 451/38, 57, 151
See application file for complete search history.

(56) References Cited

U.S. PATENT DOCUMENTS

| | | | | |
|---|---|---|---|---|
| 2,107,084 | A * | 2/1938 | Pletcher | B24C 5/02 417/187 |
| 3,972,150 | A * | 8/1976 | Hart | B24C 7/0038 451/99 |
| 4,648,215 | A | 3/1987 | Hashish et al. | |
| 5,144,766 | A | 9/1992 | Hashish et al. | |
| 7,108,585 | B1 * | 9/2006 | Dorfman | B24C 1/045 83/53 |
| 8,210,908 | B2 * | 7/2012 | Hashish | B24C 7/0076 451/38 |
| 8,353,741 | B2 * | 1/2013 | Fowler, III | B24C 1/086 451/39 |
| 2014/0004776 | A1 * | 1/2014 | Bury | B24C 1/045 451/102 |

FOREIGN PATENT DOCUMENTS

| | | |
|---|---|---|
| CN | 205310080 | 6/2016 |
| EP | 2801442 | 9/2015 |
| JP | H0349899 | 3/1991 |

OTHER PUBLICATIONS

Search Report, Industrial Property Office of the Czech Republic, dated Feb. 4, 2019.

* cited by examiner

*Primary Examiner* — Joel D Crandall
*Assistant Examiner* — Sidney D Hohl
(74) *Attorney, Agent, or Firm* — Cionca IP Law P.C.; Marin Cionca

(57) ABSTRACT

An abrasive head with inserted jet for cleaning/removing material surfaces and splitting/cutting materials by a liquid beam enriched with solid abrasive particles to extend the tool lifetime by eliminating damage to the liquid jet's aperture by the abrasive, avoid degrading the abrasive inside the tool and increase the cutting power and flow efficiency.

9 Claims, 5 Drawing Sheets

ABRASIVE HEADS WITH INSERTED JET

TECHNOLOGICAL FIELD

Figure 1:
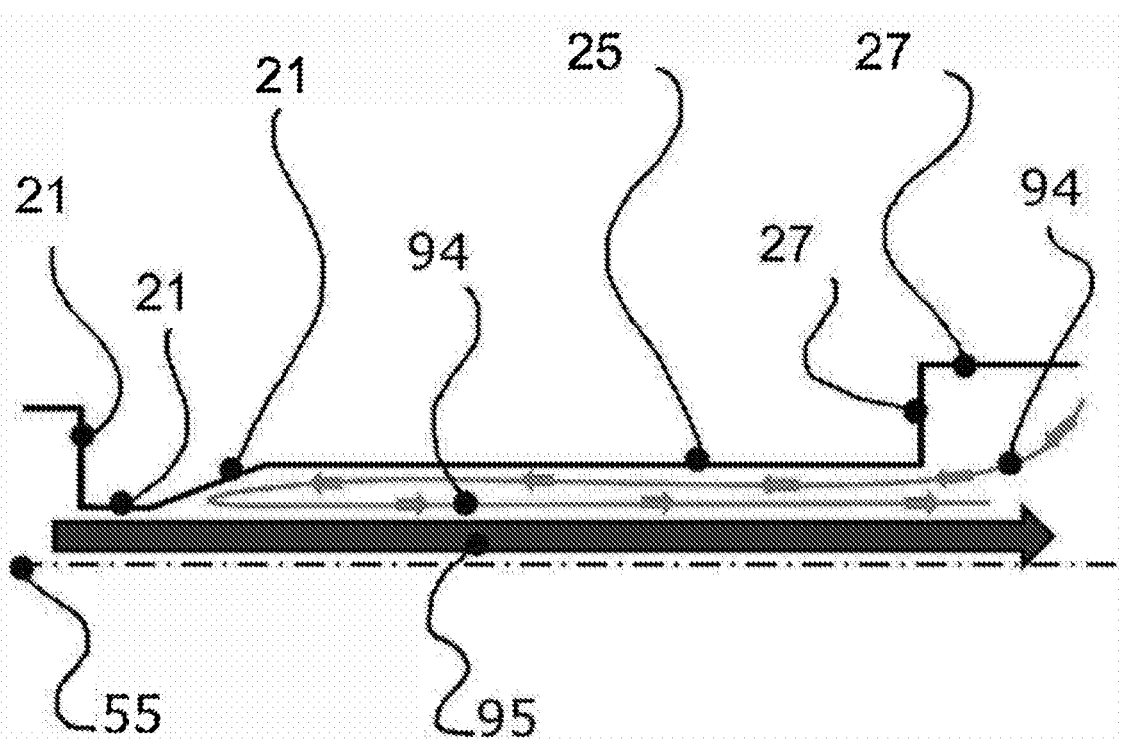

The technical solution falls within the hydraulics area. The patent subject-matter is a tool to clean/remove material surfaces and split/clean materials with a liquid beam enriched with solid abrasive particles.

STATE OF THE ART

At present, an abrasive head is used as a tool with predominantly automatic gas and abrasive intake to split and cut various materials. The tool consists of three main components: liquid jet, mixing chamber and abrasive jet. The above-mentioned components are positioned in line along the tool axis in a way that the high-speed liquid beam formed by a liquid jet passes all along the tool axis. Water may be used as the liquid here. Air may be used as the gas. The liquid jet is designed to convert pressure energy into kinetic energy, thus creating a high-speed liquid beam. The thin liquid beam passes through the center of the tool or other abrasive head's main parts. The beam movement in the mixing chamber center may result in automatic gas and abrasive intake into the mixing chamber. The gas and abrasive particles are accelerated here by the high-speed liquid beam motion. The created mixture of liquid, gas and abrasive particles flows on to pass through the abrasive jet center. Further acceleration of the gas and abrasive particles is made by the action of the high-speed liquid beam flowing in housing interior of the abrasive jet, which is largely formed by an input cone linked with the upstream mixing chamber shape and a long cylindrical opening.

The general technology status is represented for example in document U.S. Pat. No. 4,648,215 (1987) which describes the jet head or document EP 2801442 (2014) A which describes a head with an auxiliary jet that allows liquid beam to be focused, thus increasing the liquid beam speed and pressure. The U.S. Pat. No. 5,144,766 (1992) document describes a cartridge that can be inserted in the current heads. The cartridge contains jet, mixing chamber and drain tube. The JP H0349899 (1991) document deals with effective abrasive and liquid beam mixing by feeding the liquid jet up to the mixing chamber in close proximity of the abrasive jet. Thus, there is no much room left for the collisions of accelerated abrasive particles and at the same, the cutting efficiency decreases as the liquid beam contact with the abrasive cloud is too short and proportionally less abrasive is being entrained by the beam. Document CN 205310080 (2016) represents general technological state.

The disadvantage of current solutions such as patents EP2853349A1 EP0873220B1 as well as US2016/0129551A1 or PV 2014-754 is that the high-speed liquid beam after the liquid jet creates such flow field of the entire mixture that allows the abrasive particles to flow up to the liquid jet itself. Intensive gas backflow is formed around the high-speed beam, carrying the abrasive particles to the liquid jet body. It's been proved that the water jet gets worn out by the abrasive particles as they flow in space directly after the water jet. The described fact shown on FIG. 1 results in significant reduction of the liquid jet's as well as the entire described tool's lifetime. Another resulting disadvantage is that guaranteeing sufficient tool lifetime requires that the liquid jet be made of very durable and costly material such as diamond.

DESCRIPTION OF THE INVENTION

A new abrasive head with inserted jet to split/cut materials by a liquid beam enriched with solid abrasive particles was developed. This head has several key functions to significantly extend the tool lifetime by eliminating damage to the liquid jet's aperture by abrasive, eliminate degradation of abrasive inside the tool and increase the cutting power and the flow efficiency.

Abrasive head with inserted jet
1. This reduces and has the advantage to fully prevent the gas and abrasive mixture from flowing reversely upstream towards the water jets, making the abrasive particles move downstream outside the tool, thus eliminating damage to the water jests and degradation of the abrasive itself.
2. This enables automatic gas and abrasive mixture intake into the mixing chamber, i.e. no overpressure is needed to feed abrasive to the water beam.
3. It focuses the gas and abrasive mixture into the liquid beam flow and outside the mixing chamber into the abrasive jet, thus streamlining the flow in the mixing chamber.

The abrasive head contains the following downstream components: at least one liquid jet connected to the common channel linked to the inserted jet leading into the mixing chamber at the end of which the abrasive jet is connected. The infeed channel located between the liquid jet and the common channel has the advantage of allowing the liquid beam to flow from the liquid jet to the common channel. At least one gas and abrasive mixture infeed leads into the mixing chamber, the air and abrasive mixture has the advantage of being fed into the mixing chamber through several symmetrically positioned infeeds. The infeeds of gas and abrasive mixture have the benefit of being connected to the gas and abrasive mixture distributor. The common channel has the benefit of being equipped with a clean gas infeed.

The inserted jet is the key component of the abrasive head. The inserted jet's inner cross section is tapered downstream and the inserted jet's output cross section is smaller than the abrasive jet cylindrical part's inner cross section.

The limitation of the gas and abrasive backflow is already provided by the significant tapering of the inserted jet which can be sized according to the water beam width or the output cross-section of the liquid jet the beam flows from. This allows us to use the infeed and common channels of any width and equip them with clean has infeeds as it's just the inserted jet that provides the tapering.

The backflow avoidance is designed in a manner that the gas and abrasive infeed makes and angle of no more than 60° with the tool axis and the output inner cross-section of the inserted jet is no more than three times as large as the cross-section delimited by the liquid beam's outer circumference, the latter making 66 to 83% out of the sum of the liquid jet output cross-sections. In the case of three 0.1 mm liquid beam cross-sections, the cross-section delimited by the integrated beam's outer circumference makes 2 to 2.5 mm, while a circle traced around the irregular beam shape is considered to be the outer circumference.

Also, it's useful to use just one of the conditions, either the gas and abrasive mixture infeed inclination alone or the inserted jet's output cross-section alone, which results at least in the backflow reduction.

As opposed to the mixture infeed by overpressure, the automatic gas and abrasive mixture intake is made through the inserted jet's narrower inner cross section compared to the abrasive jet cylindrical section's inner cross section. The underpressure created during the liquid beam expansion from the inserted jet into the mixing chamber and the subsequent flow into/from the larger abrasive jet's input hole is used just for the gas and abrasive mixture intake into the mixing chamber and the liquid beam flow.

Another significant and useful feature of the abrasive head is the inserted jet's outer shape with the benefit of downstream tapering. This shape is employed by embedding the inserted jet in the mixing chamber while this conical outer shape of the inserted jet continuously tapers the mixing chamber inner space, thus directing and further focusing the gas and abrasive mixture into the liquid beam stream.

The backflow avoidance has even simpler design solution with the abrasive head containing liquid beam infeed channels having the benefit of employing at least one clean air intake. The clean gas infeed make the gas intake into the abrasive head, thus eliminating unwanted air recirculation along with the particles of the abrasive itself that harm the tool's internal components and mainly the liquid jet. The recirculation is shown on FIG. 1 with FIG. 2 describing gas and abrasive upstream recirculation up to the liquid jet in case when no clean gas infeed is installed, while FIG. 2 shows clean gas flow through the channel downstream the liquid beam flow which eliminates backward recirculation of gas and abrasive by filling the entire channel. Thus, clean gas supply into the infeed channels is made separately before the abrasive infeed.

It's useful to employ the multiple liquid jet abrasive head whose beams interfere with each other, which can be used to increase the head cutting power while the liquid beam interference can be set to take place either in the common channel or only in the inserted jet.

The liquid jet is positioned in the tool axis downstream the pressurized water infeed, leading into the infeed or directly into the common channel. The common channel is tapered downstream with the inserted jet before the mixing chamber input, the inserted jet output cross section has the advantage of being smaller than the abrasive jet cylindrical section's cross section. Not only does the inserted jet limit the penetration of the abrasive particles in the vicinity of the liquid jets but it also allows the amount of the automatically intaken gas and abrasive mixture to be controlled by setting the output hole size. In the case of the useful tool solution with clean gas infeed into the common channel, the inserted jet controls the ratio between the clean gas being automatically intaken into the common channel and the gas and abrasive mixture being automatically intaken into to mixing chamber. If the inserted jet output inner cross section is equal or smaller than the abrasive jet cylindrical section's cross section, the automatic intake of both clean gas and abrasive mixture into the tool is enabled.

At the same time, it's useful if the inserted jet output cross section is no more than three times as large as the liquid beam cross section, mainly with the multi-jet layout of the integrated liquid beam.

The inserted jet has the benefit of being designed as a body from durable material compatible with currently manufactured jet heads. Thus, the inserted jet can extend the lifetime of an existing tool. The inserted jet can be installed in an existing tool in a fairly easy way such as with electro-erosive machining. The existing common channel downstream the water jet is enlarged so that the inserted jet's body can be placed in the newly created space. Thus, in the case of a new tool, damage to the liquid jet by abrasive particles is reduced, avoiding the abrasive head cutting power reduction at the same time. Also, flow improvement of the mixture of liquid, gas and abrasive particles by appropriate shape of the inserted jet outer body part can be reached.

The inserted jet body is being put in a new or existing tool on the boundary of the common channel and the mixing chamber. Thus, the outer shape of the inserted jet body enables to finish the mixing chamber space so that the abrasive acceleration in the mixing chamber can go without the abrasive particles interacting with the neighboring walls of given abrasive head components at high velocities, which results in avoiding damage to the tool itself and degrading the abrasive particles, both of which increases the cutting power of the tool itself. The inserted jet interior output hole can be brought significantly nearer the abrasive jet by tapering the shape of the inserted jet's outer section, regardless of connecting the gas and abrasive mixture infeeds into the mixing chamber. This eliminates the mixing chamber space as well as the space with high speeds determined by the high-speed liquid beam passing through the mixing chamber. This results in reducing the likelihood of degrading the abrasive and neighboring walls in the mixing chamber and at the abrasive jet input. It's especially useful to employ the inserted jet outer shape to finish the mixing chamber space if there is more than one gas and abrasive mixture infeed into the mixing chamber. This results in a significant deceleration of the abrasive particles already in the aforementioned gas and abrasive mixture infeeds, which results in lower hydraulic losses and the avoidance of the abrasive degradation due to its interaction with the mixing chamber's neighboring walls, as the kinetic energy of the particles entering the mixing chamber significantly decreases with the flow velocity decrease. This energy is responsible for degrading the abrasive particles if an abrasive particle collides with the mixing chamber wall. Embedding the inserted jet outer shape into the mixing chamber leads to minimizing the space containing the high-speed abrasive particles, resulting in the creation of flow field having the advantage with respect to further effective abrasive particle acceleration with the high-speed liquid beam. Appropriate shaping of the inserted jet outer section and embedding the jet into to mixing chamber leads to an increase in the cutting power of the modified abrasive head.

The inserted jet positioned between the common channel and the mixing chamber causes hydraulic losses. As the liquid beam passes through the tool center as well as the center of the aforementioned inserted jet, this hydraulic loss is very low with respect to the input hydraulic power value upstream the liquid jet. The hydraulic loss caused by the inserted jet can be further reduced by clean air intake into the common channel. Owing to the presence of gas near the tool inner walls and mainly near the inserted jet inner walls, the hydraulic loss will be cut down to a minimum thanks to the low viscosity value of gas compared to liquid. Thus, there is no reduction of the cutting power during operating the abrasive head with inserted jet compared to the condition without the inserted jet. Thanks to a very low hydraulic loss of the inserted jet, the gas and abrasive particle mixture can be transported in the mixing chamber by automatic intake caused by the liquid beam passing through the tool center just like in the case of a tool without an inserted jet.

The inserted jet inner shape has the benefit of being defined by the flow cross-section downstream tapering. The inserted jet output flow cross-section is the smallest flow cross-section of the inserted jet inner shape.

The inserted jet can be also used in tools with multiple liquid jets.

Absolute prevention of any contact of the abrasive particles with the liquid jets can be made in two following ways: The first way is the tool implementation with inserted jet and clean gas intake. Thanks to the clean gas intake, the gas recirculation in the common channel and the infeed channel is avoided with the abrasive moving in the tool only downstream the liquid flow. Another way is the tool implementation with the inserted jet body embedded into the mixing chamber and the gas and abrasive mixture infeed inclined by less than 60° to the tool axis downstream. A combination of these conditions prevents the abrasive particles from penetrating upstream to the liquid jets, which significantly extends the lifetime of the entire tool, mainly the costly liquid jets.

The inserted jet body has the benefit of being placed in the tool's bearing housing together with other components such as the mixing chamber housing and the abrasive jet body. The inserted jet body must be fixed in the tool bearing housing in an demountable or non-demountable manner to prevent the inserted jet from shifting or rotating during the abrasive head operation. The inserted jet body material has the benefit of being abrasion-resistant so that the inserted jet body outer section can resist loads from flowing abrasive particles in the mixing chamber.

Tool Design Implementation

The tool design should be selected with respect to the tool load level. Stressed tool components, bearing housings and jets may be made of hard metal or high-strength abrasive-resistant steel (such as 17-4PH, 17022, 1.4057 or 17346 steel etc.) and it's recommended to select high-strength materials such as diamond or sapphire for the jets. For connections and unstressed tool parts, it's possible to select less resistant materials such as PVC.

It's useful when the tool is made of a bearing housing in which the liquid jet inner housing is inserted along with other tool components. The pressurized water connection is located on the top part of the bearing housing. The liquid jet body, the common channel housing, the inserted jet body and the mixing chamber housing are placed inside the inner body while the housings and other components may be connected using threaded joint, press connection or other permanent or demountable means. More housings and/or components can be made of a single piece. The abrasive jet body is placed at the bottom of the bearing housing. As a benefit, the abrasive jet body can be fixed in the bearing housing with a threaded joint or can be attached to the bearing housing via a collet with a nut. The mixing chamber can be a direct part of the bearing housing.

SUMMARY OF PRESENTED DRAWINGS

Figure 2:
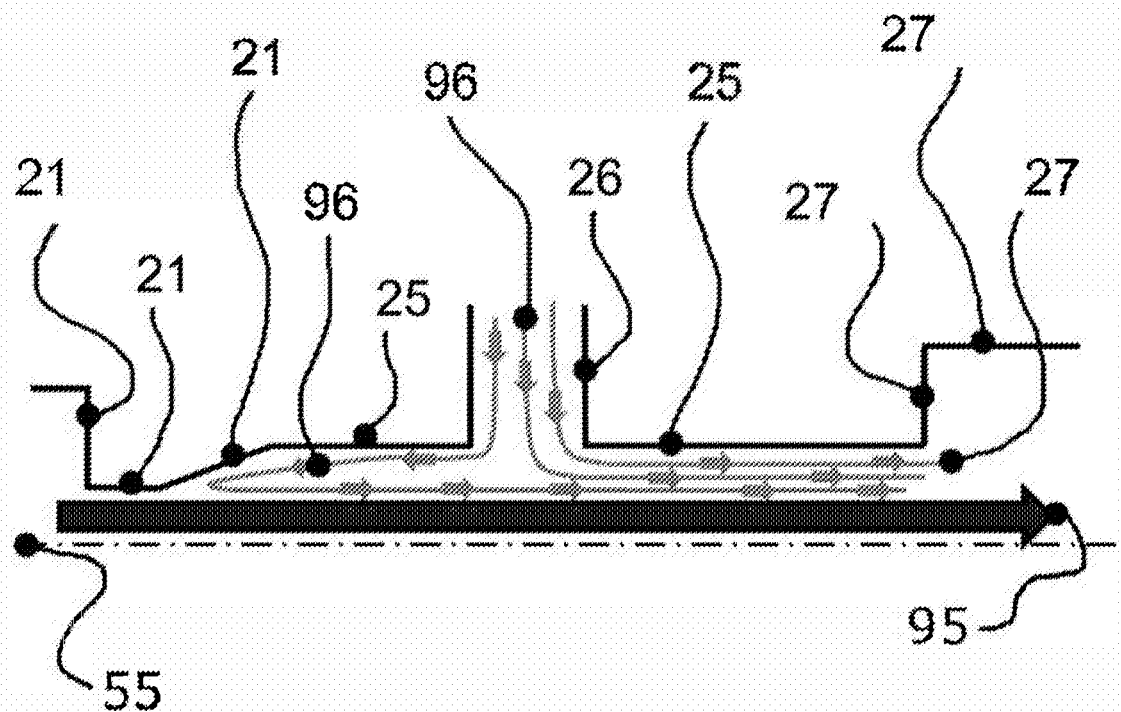

FIG. 1. Technology status. A tool without separate clean gas infeed 96 without an inserted jet.

FIG. 2. A tool with separate clean air 96 infeed 26 without the gas and abrasive mixture recirculation 94.

Figure 3:
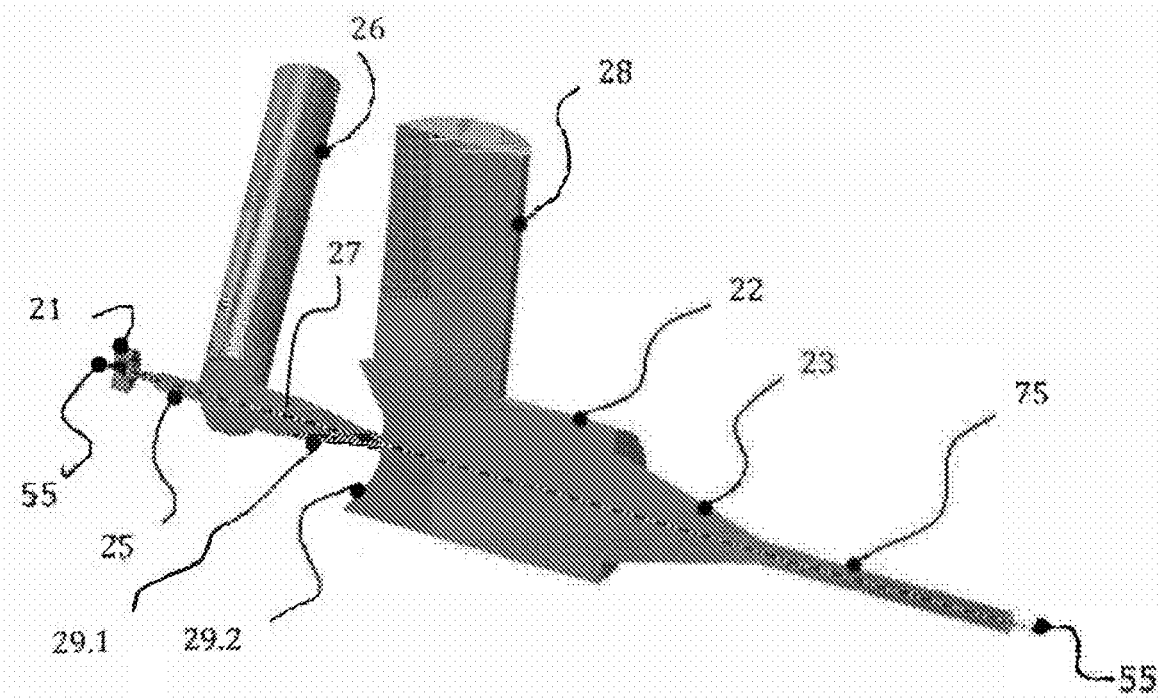

FIG. 3. An abrasive head according to example 1 with clean gas 96 infeed 26 into the common channel 27 and an inserted jet 29.

Figure 4:
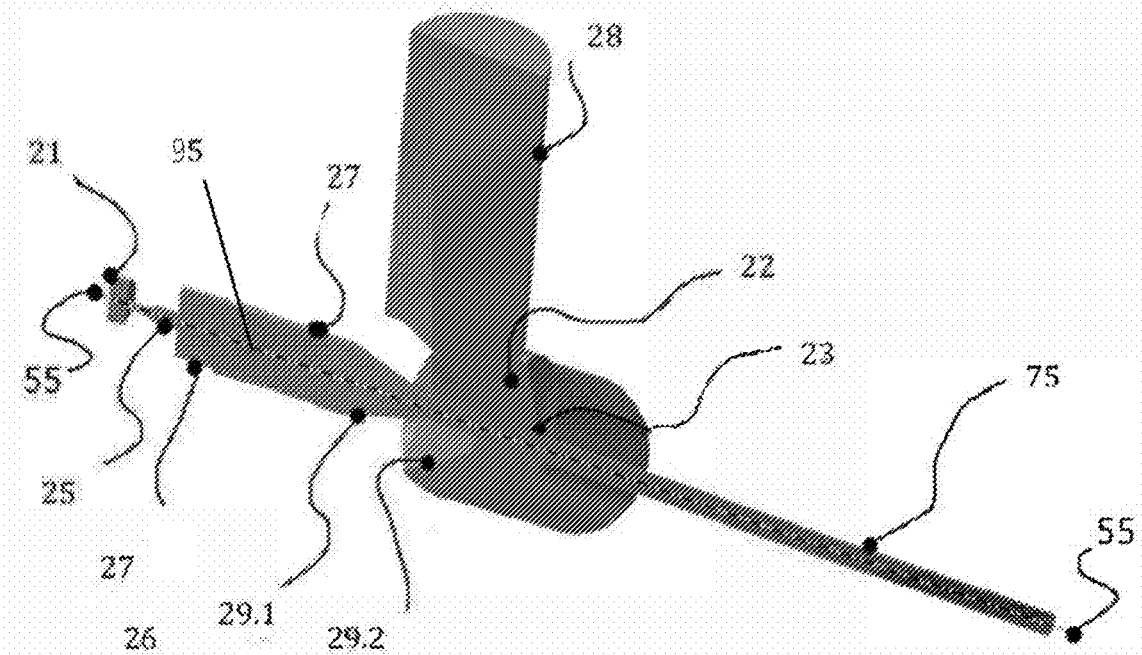

FIG. 4. Abrasive head according to example 2 with three infeeds 28 of the gas and abrasive mixture 94, inserted jet 29, employing the jet outer shape 29.2 to appropriately finish the mixing chamber shape 22.

Figure 5:
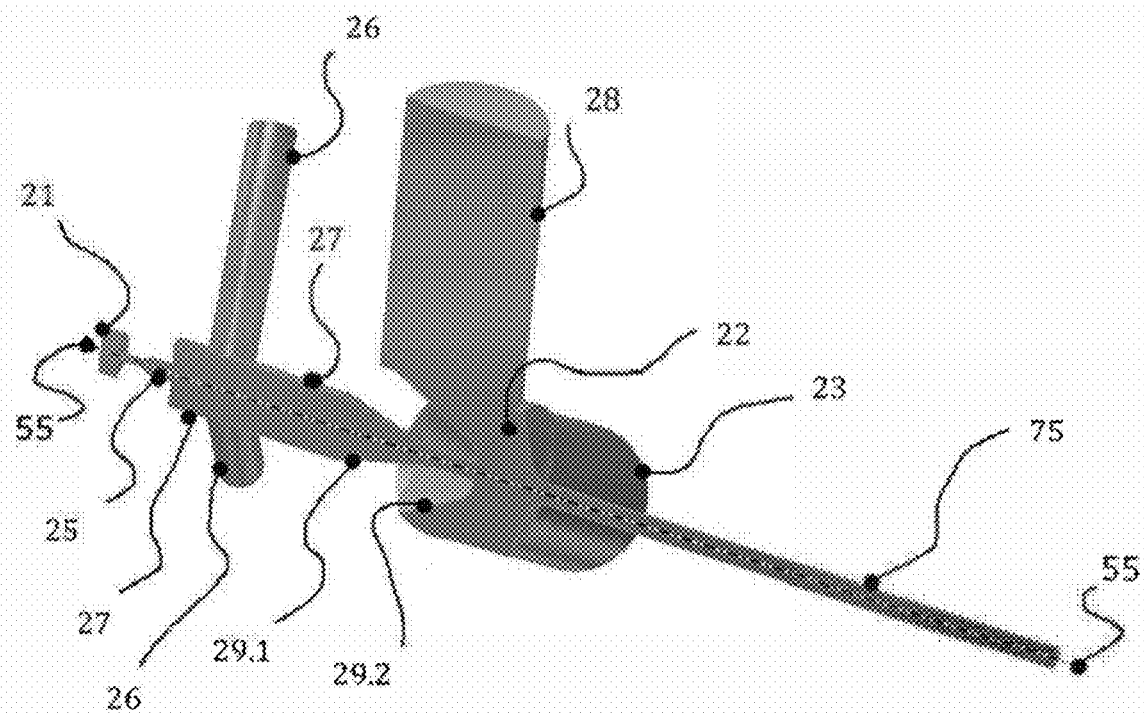

FIG. 5. Abrasive head according to example 3 with three infeeds 26 of clean 96, three infeeds 28 of gas and abrasive mixture 94, inserted jet 29, employing the jet outer shape 29.2 to appropriately shape the mixing chamber 22.

Figure 6:
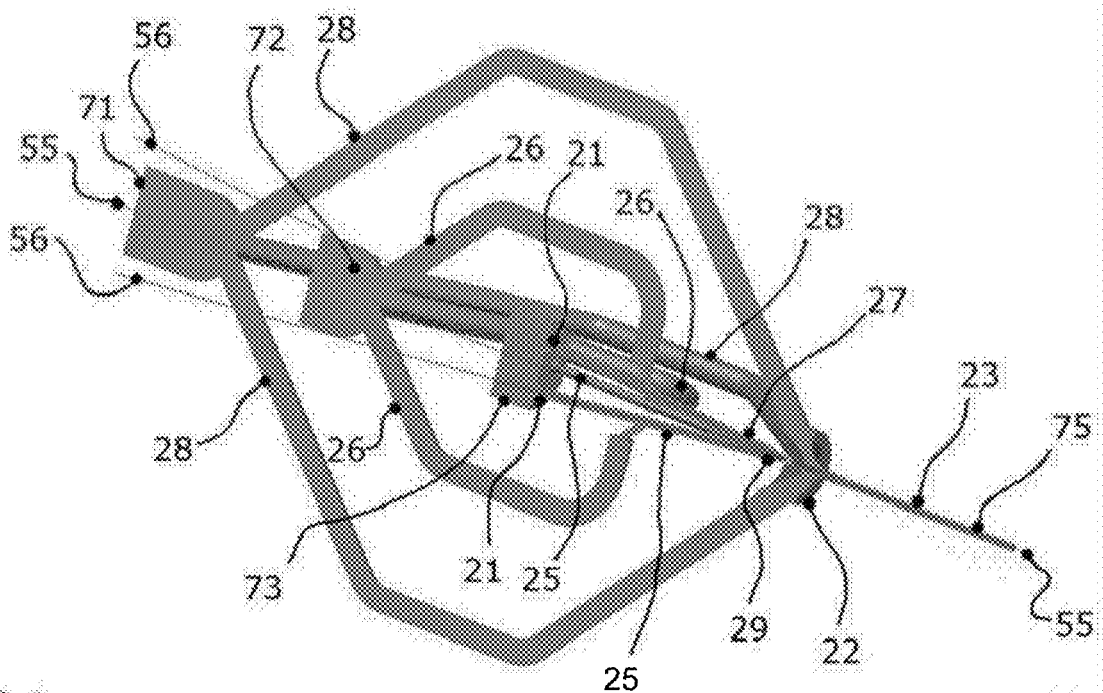

FIG. 6. Abrasive head according to example 4 with four liquid jets 21 and clean gas 96 infeed 26 through separated infeed channels 25 and four infeeds 28 of the gas and abrasive 94 mixture into the mixing chamber 22.

Figure 7:
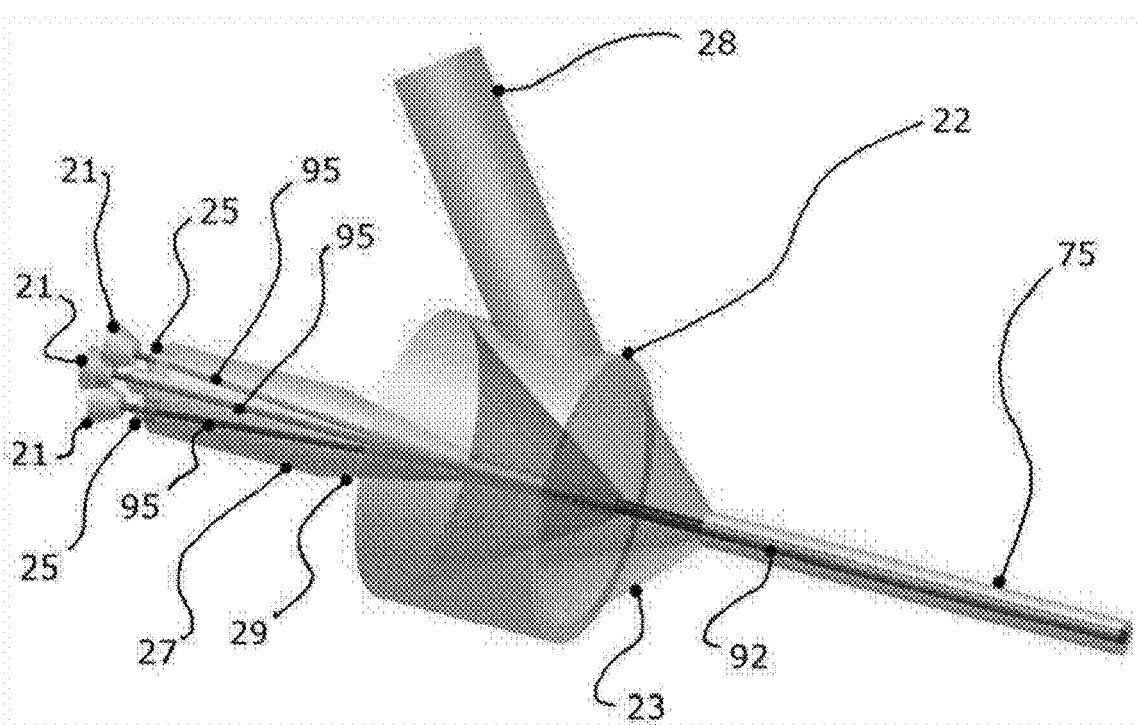

FIG. 7. Abrasive head according to example 5 with three liquid jets 21 and a single infeed 28 of the gas and abrasive mixture 94 leading into the mixing chamber 22 downstream under 35°.

Figure 8:
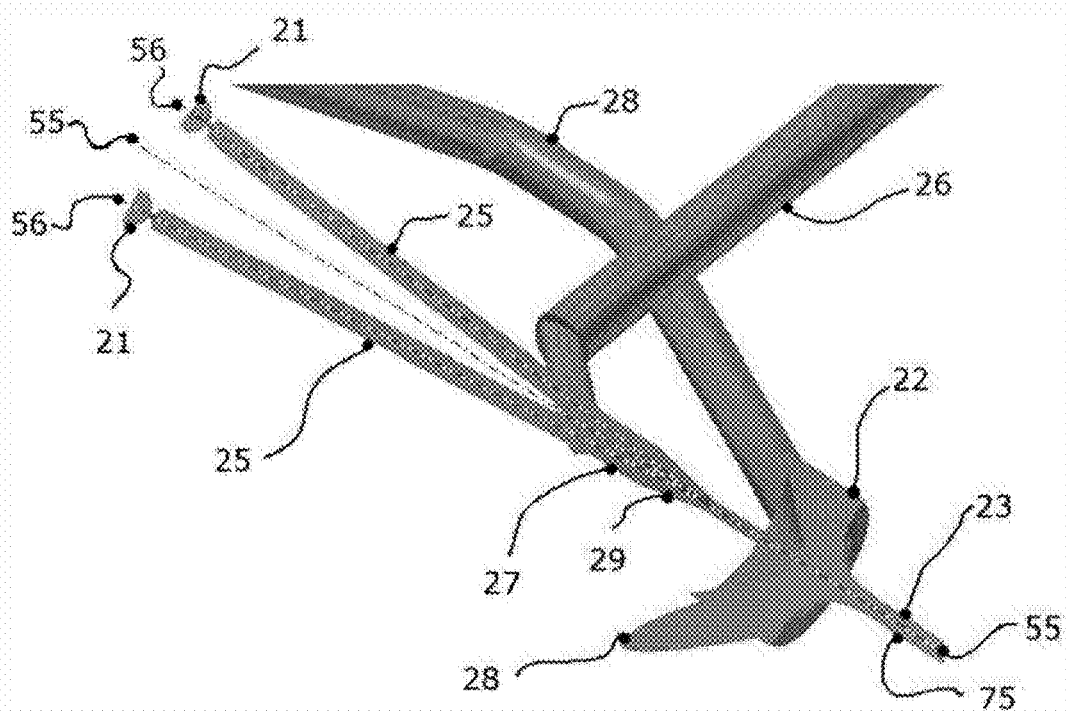

FIG. 8. Abrasive head according to example 6 with two liquid jets 21 and a single clean gas 96 infeed 26 through into the common channel 27 and three infeeds 28 of the gas and abrasive 94 mixture into the mixing chamber 22.

Figure 9:
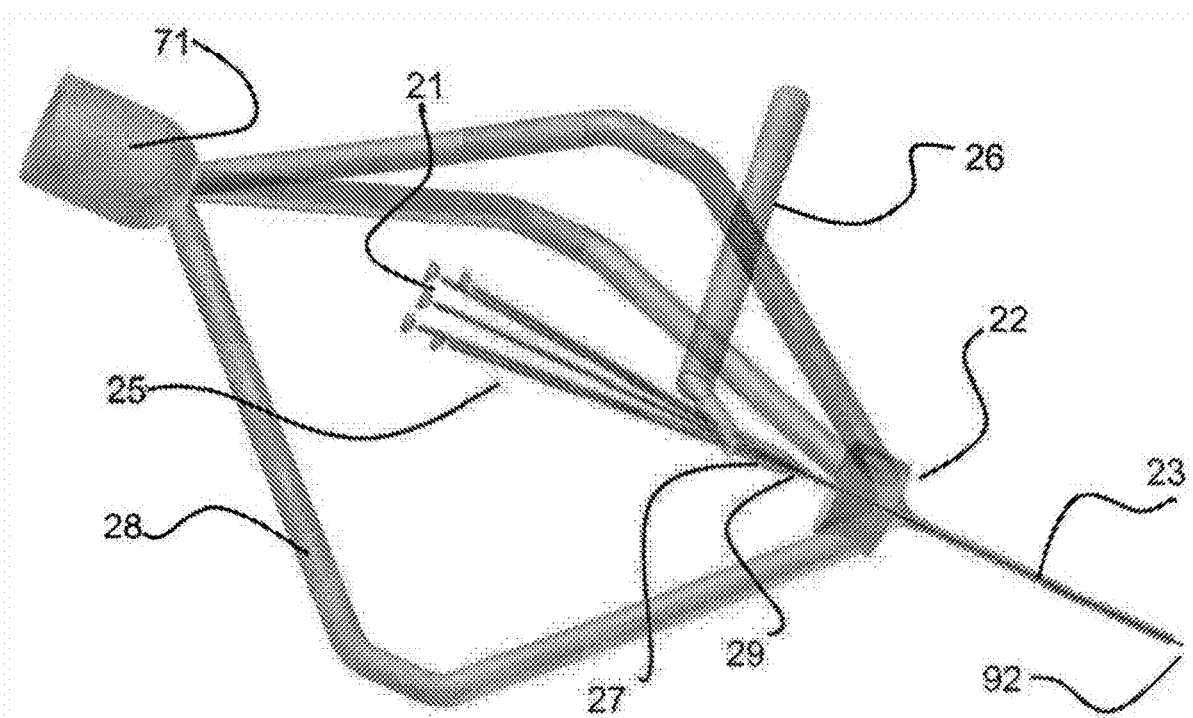

FIG. 9. Abrasive head according to example 7 with five liquid jets 21 positioned in two depths of the unit and a single clean gas 96 infeed 26 with three gas and abrasive mixture 94 infeeds 28 into the mixing chamber 22.

Figure 10:
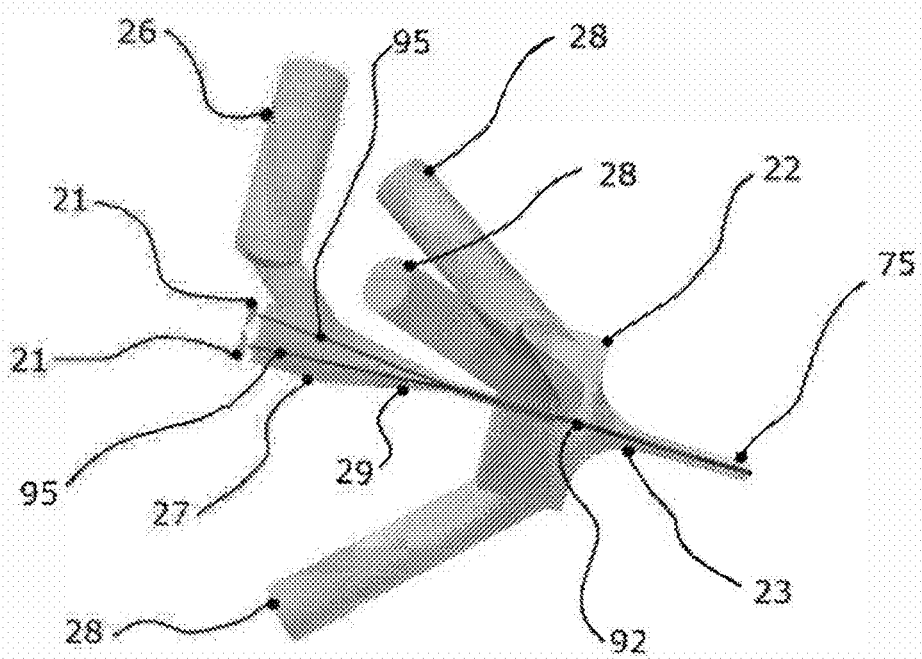

FIG. 10. Abrasive head according to example 7 with two liquid jets 21 leading into the common channel 27 and a single clean gas 96 infeed 26 into the common channel 27 and three infeeds 28 of the gas and abrasive 94 mixture into the mixing chamber.

EXAMPLES OF INVENTION EXECUTION

Example 1

An abrasive head with a clean gas infeed into the common channel and an inserted jet.

FIG. 3 shows a tool design example with clean gas intake 96 through the infeed 26 leading into the common channel 27 downstream the liquid jet 21 located downstream the pressurized liquid infeed 73. The liquid jet 21 is connected to the short infeed channel 25 leading into the common channel 27 together with the clean gas 96 infeed 26. The tool main components, i.e. liquid jet 21, mixing chamber 22 and abrasive jet 23 are positioned in the tool axis 55, while the liquid jet 21 axis 56 is identical with the infeed channel axis 25 and the tool axis 55. The common channel 27 is tapered downstream at its end with the inserted jet 29 delimited by its outer shape 29.2 and inner shape 29.1, while the ratio of the inner output cross section of the inserted jet 29 to the liquid jet cross section is 3:1. The inserted jet 29 leads into the mixing chamber 22 together with one infeed 28 of the gas and abrasive mixture 94. The gas and abrasive mixture 94 enters the mixing chamber 22 through the infeed 28 of the gas and abrasive mixture 94 automatically, just like the clean gas 96 is automatically intaken through the clean gas 26 infeed 96. The gas and abrasive mixture 94 accelerated by the common high-speed liquid beam 95 enters the abrasive jet 23 connected to the mixing chamber 22. The abrasive jet 23 is positioned in the tool axis 55 at the tool's end. At this point, further acceleration of the described mixture occurs before impacting on the cut material.

The abrasive head bearing housing, where liquid jet 21 body, mixing chamber housing 22 and abrasive jet body 23 are placed, contains infeed channel 25 downstream the liquid jet 21, clean gas 96 infeed 26 and the infeed 28 of the gas and abrasive mixture 94. It's made of 17-4PH steel. The mixing chamber housing 22 is made of hard metal. The abrasive jet's housing 23 is made of hard metal. Clean gas 96 infeed 26 made of 17022 steel is connected to the abrasive head's bearing housing. Gas and abrasive mixture 94 infeed 28 made of 17022 steel is connected to the abrasive head's bearing housing.

In case of a tool made according to example 1, there is no gas recirculation thanks to the presence of clean gas 96 infeed 26 into the common channel 27. Thanks to the avoidance of recirculation and the inserted jet 29 of the common channel 27, the abrasive particles do not get near and do not harm the liquid jets 21. At the same time, there is no degradation of the abrasive particles themselves.

Example 2

Abrasive head with inserted jet, using its outer shape for appropriate mixing chamber shape finishing.

FIG. 4 shows a tool design example with inserted jet 29. The tool's main components—liquid jet 21, mixing chamber 22 and abrasive jet 23—are located along the tool axis 55. The inserted jet 29 is located before the liquid beam 95 enters the mixing chamber 22, while the ratio of the inserted jet inner output cross section 29 to the water jet cross section is 2.5:1 with the outer shape 29.2 of the jet being tapered downstream and the inserted jet being embedded into the mixing chamber. The shape of the flow field at the inserted jet output 29 significantly reduces the abrasive particles passing through the inserted jet 29 up to the liquid jet 21. Three gas and abrasive mixture 94 infeeds 28 are connected to the mixing chamber 22. The mentioned gas and abrasive mixture 94 is automatically intaken into the mixing chamber 22 owing to the high-speed liquid beam 95 flowing along the tool axis 55. The abrasive particles accelerated in the mixing chamber 22 and the abrasive jet 23 then impact on the cut material.

The abrasive head bearing housing, where liquid jet 21 body and abrasive jet body 23 are placed, contains infeed channel 25 downstream the liquid jet 21, mixing chamber 22 and the infeed 28 of the gas and abrasive mixture 94. It's made of 1.4057 abrasion-resistant steel. The abrasive jet's housing 23 is made of hard metal. Clean gas 96 infeed 26 made of 17346 steel is connected to the abrasive head's bearing housing. The gas and abrasive mixture 94 infeed 28 made of 17346 steel is connected to the abrasive head's bearing housing.

In the tool made according to example 2, the gas recirculation is significantly reduced thanks to the inserted jet 29 presence. Thanks to the avoidance of recirculation and the inserted jet 29 of the common channel 27, the abrasive particles do not get near and do not harm the liquid jet 21. At the same time, there is no degradation of the abrasive particles themselves.

Example 3

The abrasive head with four clean gas infeeds, infeed of gas and abrasive mixture, inserted jet, employing the jet outer shape to appropriately shape the mixing chamber.

FIG. 5 shows a tool design example with clean gas intake 96 using four infeeds 26 leading into the common channel 27 downstream the liquid jet 21 and with the inserted jet 29. The tool's main components—liquid jet 21, mixing chamber 22 and abrasive jet 23—are located along the tool axis 55. Between the liquid jet 21 and the mixing chamber 22, clean gas 96 automatic intake is made through four infeeds 26 of the clean gas 96 connected to the common channel 27. The inserted 29 jet is positioned after the clean gas 96 infeed 26, while the ratio of the inserted jet's inner output cross section 29 to the liquid jet cross section is 2.7:1. The inserted jet's inner shape 29.1 is tapered downstream the high-speed liquid beam 95 in a manner that the flow field shape at the inserted jet's inner section output 29.1 prevents the abrasive particles from flowing back to the liquid jet 21. The inserted jet's outer shape 29.2, rounded and tapered downstream, helps to define the mixing chamber space 22 in a manner to avoid degradation of the abrasive particles as they interact with the tool's neighboring walls while the gas and abrasive mixture 94 is flowing into the mixing chamber 22. Three gas and abrasive mixture 94 infeeds 28 lead into the mixing chamber 22. The mentioned gas and abrasive mixture 94 is automatically intaken into the mixing chamber 22 just like the clean gas 96 through the clean gas 96 infeed 26 owing to the high-speed liquid beam 95 flowing along the tool axis 55. The abrasive particles accelerated in the mixing chamber 22 and the abrasive jet 23 then impact on the cut material.

The abrasive head bearing housing, where liquid jet 21 body and abrasive jet body 23 are placed, contains infeed channel 25 downstream the liquid jet 21, clean gas 96 infeed 26, common channel 27, mixing chamber 22 and the infeed 28 of the gas and abrasive mixture 94. It's made of 17-4PH steel. The abrasive jet's housing 23 is made of hard metal. Clean gas 96 infeed 26 made of 17346 steel is connected to the abrasive head's bearing housing. The gas and abrasive mixture 94 infeed 28 made of 17346 steel is connected to the abrasive head's bearing housing.

In case of a tool made according to example 3, there is no gas recirculation thanks to the presence of clean gas 96 infeeds 26 into the common channel 27. Thanks to the avoidance of recirculation and the inserted jet 29 of the common channel 27, the abrasive particles do not get near and do not harm the liquid jets 21. At the same time, there is no degradation of the abrasive particles themselves.

Example 4

An abrasive head with four liquid (water)jets and clean gas intake through separated infeed channels and four inputs of the gas and abrasive mixture intake into the mixing chamber.

FIG. 6 shows an example of the tool design with four liquid jets 21, while the liquid jets 21 are positioned in a rotationally symmetric pattern around the tool axis 55 after the pressurized liquid infeed 73. The axes 56 of the liquid jets 21 and those of the separated infeed channels 25 make an angle of 15° with the tool axis 55. Each liquid jet 21 is connected to its own infeed channel 25 with a constant cross section which allows the high-speed liquid beam 95 to flow from a given liquid jet 21 into the intersection defined by the intersection 56 of the liquid jet 21 axes and the tool axis 55. Each infeed channel 25 is equipped with clean a gas 96 infeed 26, while the clean gas 96 is being automatically intaken into the separated infeed channels 25. The clean gas 96 infeeds 26 lead into the common clean gas 96 distributor 72. Four separated infeed channels 25 merge into one common channel 27 with a constant cross section. At this point, individual liquid beams 95 merge into one common beam continuing along the tool axis 55. The common channel 27 is equipped with the inserted jet 2 before entering the mixing chamber 22, while the ratio of the inserted jet's inner output cross section 29 to the liquid jet cross section is 1.7:1. The inserted jet's outer shape 29.2, rounded and tapered downstream, helps to define the mixing chamber space 22 in a manner to avoid degradation of the abrasive particles as they interact with the tool's neighboring walls while the gas and abrasive mixture 94 is flowing into the mixing chamber 22. Four gas and abrasive mixture 94 infeeds 28 lead into the mixing chamber 22. The gas and abrasive mixture 94 enters the mixing chamber 22 through the infeeds 28 of the gas and abrasive mixtures 94 automatically owing to the suction in the mixing chamber 22. The gas and abrasive 94 mixture infeeds 28 are connected to the common distributor 71 of the gas 94 and abrasive mixture. The gas and abrasive mixture 94 accelerated by the common high-speed liquid beam 92 enters the abrasive jet 23. The abrasive jet 23 is positioned in the tool axis 55 at the tool's end. At this point, further acceleration of the described mixture occurs before impacting on the cut material.

The abrasive head's bearing housing where liquid jet 21 housing, inserted jet 29, mixing chamber housing 22 and abrasive head housing 23 are placed is made of 17-4PH steel. The jet housing where the liquid jets 21 are placed is made of 17346 steel. The inserted jet body 29 is made of 1.4057 abrasion-resistant steel. The mixing chamber housing 22 is made of 1.4057 abrasion-resistant steel. The abrasive jet's housing 23 is made of hard metal. The clean gas 96 infeed 26 is made of PVC. The clean gas 96 distributor housing 72 is made is 17022 steel. The gas and abrasive mixture 94 infeed 28 is made of PVC. The gas and abrasive mixture 94 distributor housing 71 is made is 17346 steel.

In case of a tool made according to example 4, there is no gas recirculation thanks to the presence of clean gas 96 infeeds 26 into the separated infeed channels 25. Thanks to the avoidance of recirculation and the inserted jet 29 of the common channel 27, the abrasive particles do not get near and do not harm the liquid jets 21. At the same time, there is no degradation of the abrasive particles themselves.

Example 5

An abrasive head with three liquid (water) jet and one input of gas and abrasive mixture intake into the mixing chamber, with 45° inclination to the tool axis.

FIG. 7 shows an example of the tool design with three liquid jets 21, while the liquid jets 21 are positioned in a rotationally symmetric pattern around the tool axis 55 after the pressurized liquid infeed 73. The axes 56 of the liquid jets 21 and those of the separated infeed channels 25 make an angle of 10° with the tool axis 55. Each liquid jet 21 is connected to its own infeed channel 25 with a constant cross section which allows the high-speed liquid beam 95 to flow from a given liquid jet 21 into the intersection defined by the intersection 56 of the liquid jet 21 axes and the tool axis 55. Three separated infeed channels 25 merge into one common channel 27 with a constant cross section. At this point, individual liquid beams 95 merge into one common integrated beam 92 continuing along the tool axis 55. The common channel 27 is equipped with the inserted jet 29 before entering the mixing chamber 22, while the ratio of the inserted jet's inner output cross section 29 to the liquid jet cross section is 6:1. The inserted jet's outer conical shape 29.2, tapered downstream and embedded into the mixing chamber 22, helps to define the mixing chamber space 22 in a manner to avoid degradation of the abrasive particles as they interact with the tool's neighboring walls while the gas and abrasive mixture 94 is flowing into the mixing chamber 22. The gas and abrasive mixture 94 infeed 28 inclined by 45° downstream to the tool's axis 55 leads into the mixing chamber 22. The gas and abrasive mixture 94 enters the mixing chamber 22 through the infeed 28 of the gas and abrasive mixtures 94 automatically owing to the suction in the mixing chamber 22. The gas and abrasive mixture 94 accelerated by the common high-speed liquid beam 92 enters the abrasive jet 23. The abrasive jet 23 is positioned in the tool axis 55 at the tool's end. At this point, further acceleration of the described mixture occurs before impacting on the cut material.

The abrasive head's bearing housing where liquid jet 21 housing, inserted jet 29, mixing chamber housing 22 and abrasive head housing 23 are placed is made of 17-4PH steel. The jet housing where the liquid jets 21 are placed is made of 17346 steel. The inserted jet body 29 is made of 1.4057 abrasion-resistant steel. The mixing chamber housing 22 is made of 1.4057 abrasion-resistant steel. The abrasive jet's body 23 is made of hard metal. The gas and abrasive mixture 94 infeed 28 is made of PVC.

In the case of the tool manufactured according to example 5, there is no gas recirculation thanks to the gas and abrasive mixture 94 infeed 28 inclination, defined ratio between the liquid jet 21 outputs and the inserted jet 29 as well as embedding the inserted jet's body 29 into the mixing chamber 22, while the outer shape 29.2 of the inserted jet 29 finishes the mixing chamber shape 22, thus contributing to eliminate the penetration of the abrasive particles to the liquid jets 21. Thanks to the avoidance of recirculation and the inserted jet 29 of the common channel 27, the abrasive particles do not get near and do not harm the liquid jets 21. At the same time, there is no degradation of the abrasive particles themselves.

Example 6

An abrasive head with two liquid (water)jets and clean gas intake into the common channel and three inputs of the gas and abrasive mixture intake into the mixing chamber.

FIG. 8 shows an example of the tool design with two liquid jets 21, while the liquid jets 21 are positioned in a rotationally symmetric pattern around the tool axis 55 after the pressurized liquid infeed 73. The axes 56 of the liquid jets 21 and those of the separated infeed channels 25 make an angle of 10° with the tool axis 55. Each liquid jet 21 is connected to its own infeed channel 25 with a constant cross section which allows the high-speed liquid beam 95 to flow from a given liquid jet 21 into the intersection defined by the intersection 56 of the liquid jet 21 axes and the tool axis 55. Two separated infeed channels 25 merge into one common channel 27 with a constant cross section. At this point, individual liquid beams 95 merge into one common beam continuing along the tool axis 55. The common channel 27 is equipped with clean a gas 96 infeed 26, while the clean gas 96 is being automatically intaken into the infeed channel 25. The common channel 27 is equipped with the inserted jet 29 before entering the mixing chamber 22. The inserted jet's outer shape 29.2, rounded and tapered downstream, helps to define the mixing chamber space 22 in a manner to avoid degradation of the abrasive particles as they interact with the tool's neighboring walls while the gas and abrasive mixture 94 is flowing into the mixing chamber 22. Three gas and abrasive mixture 94 infeeds 28 lead into the mixing chamber 22. The gas and abrasive mixture 94 enters the mixing chamber 22 through the infeeds 28 of the gas and abrasive mixtures 94 automatically owing to the suction in the mixing chamber 22. The gas and abrasive 94 mixture infeeds 28 are connected to the common distributor 71 of the gas 94 and abrasive mixture. The gas and abrasive mixture 94 accelerated by the common high-speed liquid beam 92 enters the abrasive jet 23. The abrasive jet 23 is positioned in the tool axis 55 at the tool's end. At this point, further acceleration of the described mixture occurs before impacting on the cut material.

The abrasive head's bearing housing where liquid jet 21 housing, inserted jet 29, mixing chamber housing 22 and abrasive head housing 23 are placed is made of 17-4PH steel. The jet housing where the liquid jets 21 are placed is made of 17346 steel. The inserted jet body 29 is made of 1.4057 abrasion-resistant steel. The mixing chamber housing 22 is made of 1734 steel. The abrasive jet's body 23 is made of hard metal. The clean gas 96 infeed 26 is made of PVC. The clean gas 96 distributor housing 72 is made of 1.4057 abrasion-resistant steel. The gas and abrasive mixture 94 infeed 28 is made of PVC. The gas and abrasive mixture 94 distributor housing 71 is made of 17346 steel.

In case of a tool made according to example 6, there is no gas recirculation thanks to the presence of clean gas 96 infeed 26 into the common channel 27. Thanks to the avoidance of recirculation and the inserted jet 29 of the common channel 27, the abrasive particles do not get near and do not harm the liquid jets 21. At the same time, there is no degradation of the abrasive particles themselves.

Example 7

An abrasive head with five liquid (water)jets positioned in two depths of the unit and clean gas intake through a single clean gas infeed and three inputs of the gas and abrasive mixture intake into the mixing chamber.

FIG. 9 shows an example of the tool design with five liquid jets 21 positioned in two sets, while the liquid jets 21 are positioned in a rotationally symmetric two-depth pattern around the tool axis 55 after the pressurized liquid infeed 73. The axes 56 of the liquid jets 21 in the first set and those of the separated infeed channels 25 make an angle of 12° with the tool axis 55. The axes 56 of the liquid jets 21 in the second set and those of the separated infeed channels 25 make an angle of 10° with the tool axis 55. Each liquid jet 21 is connected to its own infeed channel 25 with a constant cross section which allows the high-speed liquid beam 95 to flow from a given liquid jet 21 into the intersection defined by the intersection 56 of the liquid jet 21 axes and the tool axis 55. The tool incorporates two intersection. First, the first three axes 56 of the liquid jets 21 intersect along with the tool axis 55.

Then, another two axes 56 of the liquid jets 21 meet at the second point of intersection along with the 55 tool axis and the merged beam of the first three liquid jets 21: Three separated infeed channels 25 merge into one common channel 27 with a constant cross section. At this point, individual liquid beams 95 merge into one common beam continuing along the tool axis 55. The common channel 27 is equipped with clean a gas 96 infeed 26, while the clean gas 96 is being automatically intaken into the common channel 27. The common channel 27 is equipped with the inserted jet formed by tapering 29 before entering the mixing chamber 22. The first intersection is located in the common channel 27, the second one in the inserted jet 29. This point is where all the liquid beams 95 merge into the single common beam 92 which further continues along the tool axis 55 into the mixing chamber 22. The inserted jet's outer shape 29.2, rounded and tapered downstream, helps to define the mixing chamber space 22 in a manner to avoid degradation of the abrasive particles as they interact with the tool's neighboring walls while the gas and abrasive mixture 94 is flowing into the mixing chamber 22. Three gas and abrasive mixture 94 infeeds 28 lead into the mixing chamber 22 under an angle of 25° to the tool axis. The gas and abrasive mixture 94 enters the mixing chamber 22 through the infeeds 28 of the gas and abrasive mixtures 94 automatically owing to the suction in the mixing chamber 22. The gas and abrasive 94 mixture infeeds 28 are connected to the common distributor 71 of the gas 94 and abrasive mixture. The gas and abrasive mixture 94 accelerated by the common high-speed liquid beam 92 enters the abrasive jet 23. The abrasive jet 23 is positioned in the tool axis 55 at the tool's end. At this point, further acceleration of the described mixture occurs before impacting on the cut material.

The abrasive head's supporting housing where liquid jets 21, inserted jet 29 formed by the inserted jet body, mixing chamber housing 22 and abrasive head housing 23, is made of 17346 steel. The mixing chamber housing 22 is made of 1.4057 abrasion-resistant steel. The abrasive jet's body 23 is made of hard metal. The clean gas 96 infeed 26 is made of 17-4PH steel. The clean gas 96 distributor housing 72 is made is 17022 steel. The gas and abrasive mixture 94 infeed 28 is made of PVC. The gas and abrasive mixture 94 distributor housing 71 is made of 17346 steel.

In case of a tool made according to example 7, there is no gas recirculation thanks to the presence of clean gas 96 infeed 26 into the common channel 27. Thanks to the avoidance of recirculation and the inserted jet 29 of the common channel 27, the abrasive particles do not get near and do not harm the liquid jets 21. At the same time, there is no degradation of the abrasive particles themselves.

Example 8

An abrasive head with two liquid (water) jets leading directly into the common channel and the clean gas intake into the common channel and three inputs of the gas and abrasive mixture intake into the mixing chamber.

FIG. 10 shows an example of the tool design with two liquid jets 21, while the liquid jets 21 are positioned in a rotationally symmetric pattern around the tool axis 55 after the pressurized liquid infeed 73. The liquid jet 21 axes 56 make an angle of 10° with the tool axis 55. Both liquid jets 21 lead directly into the common channel 27 with a constant cross section which allows the high-speed liquid beam 95 to flow from a given liquid jet 21 into the intersection defined by the intersection 56 of the liquid jet 21 axes and the tool axis 55. At this point, individual liquid beams 95 merge into one common beam continuing along the tool axis 55. The common channel 27 is equipped with clean a gas 96 infeed 26, while the clean gas 96 is being automatically intaken into the infeed channel 25. The common channel 27 is equipped with the inserted jet 29 before entering the mixing chamber 22, while the ratio of the inserted jet's inner cross section 29 to the liquid jet cross section is 1.3:1. The inserted jet's outer shape 29.2, which is tapered downstream, helps to define the mixing chamber space 22 in a manner to avoid degradation of the abrasive particles as they interact with the tool's neighboring walls while the gas and abrasive mixture 94 is flowing into the mixing chamber 22. Three gas and abrasive mixture 94 infeeds 28 lead into the mixing chamber 22 under an angle of 25° to the tool axis. The gas and abrasive mixture 94 enters the mixing chamber 22 through the infeeds 28 of the gas and abrasive mixtures 94 automatically owing to the suction in the mixing chamber 22. The gas and abrasive 94 mixture infeeds 28 are connected to the common distributor 71 of the gas 94 and abrasive mixture. The gas and abrasive mixture 94 accelerated by the common high-speed liquid beam 92 enters the abrasive jet 23. The abrasive jet 23 is positioned in the tool axis 55 at the tool's end. At this point, further acceleration of the described mixture occurs before impacting on the cut material.

The abrasive head's bearing housing where liquid jet 21 housing, inserted jet 29, mixing chamber housing 22 and abrasive head housing 23 are placed is made of 17-4PH steel. The jet housing where the liquid jets 21 are placed is made of 17346 steel. The inserted jet body 29 is made of 1.4057 abrasion-resistant steel. The mixing chamber housing 22 is made of 17346 steel. The abrasive jet's body 23 is made of hard metal. The clean gas 96 infeed 26 is made of PVC. The clean gas 96 distributor housing 72 is made of 1.4057 abrasion-resistant steel. The gas and abrasive mixture 94 infeed 28 is made of PVC. The gas and abrasive mixture 94 distributor housing 71 is made of 17346 steel.

In case of a tool made according to example 6, there is no gas recirculation thanks to the presence of clean gas 96 infeed 26 into the common channel 27. Thanks to the avoidance of recirculation and the inserted jet 29 of the common channel 27, the abrasive particles do not get near and do not harm the liquid jets 21. At the same time, there is no degradation of the abrasive particles themselves.

LIST REFERENCE MARKS

21—liquid jet
22—mixing chamber
23—abrasive jet
25—infeed channel
26—clean gas infeeds 96
27—common channel
28—infeeds of gas and abrasive mixture 94
29—inserted jet, common channel tapering 27
29.1—inner shape of inserted jet
29.2—outer shape of inserted jet
55—tool axis
56—liquid jet 21 axis
71—distributor of gas and abrasive mixture 94
72—clean gas distributor 96
73—pressurized liquid infeed
75—abrasive jet cylindrical section 23
92—common liquid beam
94—gas and abrasive mixture
95—liquid beam
96—clean gas

APPLICABILITY IN INDUSTRY

Cleaning materials, removing material surfaces, splitting or cutting materials by liquid beam enriched with abrasive solid particles.

The invention claimed is:

1. An abrasive head with inserted jet, the abrasive head containing at least one liquid jet (21), a mixing chamber (22) equipped with at least one gas and abrasive mixture (94) infeed (28) connected to an abrasive jet (23) downstream from the liquid jet, wherein the liquid jet (21) leads into a common channel (27) which merges into the inserted jet (29) leading into the mixing chamber (22), while the inserted jet and the abrasive jet (23) lie in a common axis (55) of the abrasive head and wherein the inserted jet comprises an outer conical shape and an inner cross section of the inserted jet (29) is rounded and tapered downstream and embedded into the mixing chamber to define a space of the mixing chamber, and the inserted jet output inner cross section is smaller than an inner cross section of a cylindrical section (75) of the abrasive jet (23) such that degradation of abrasive particles of the at least one gas and abrasive mixture due to interaction with interior walls of the mixing chamber is avoided.

2. The abrasive head with inserted jet according to claim 1, wherein an infeed channel (25) is placed between the liquid jet (21) and the common channel (27).

3. The abrasive head with inserted jet according to claim 1, wherein the common channel (27) is equipped with a clean gas (96) infeed (26).

4. The abrasive head with inserted jet according to claim 2, wherein the infeed channel (25) is equipped with a clean gas (96) infeed (26).

5. The abrasive head with inserted jet according to claim 1, wherein a narrower end of the inserted jet (29) is rounded and embedded in the mixing chamber (22).

6. The abrasive head with inserted jet according to claim 1, wherein an axis of the gas and abrasive mixture (94) infeed (28) makes an angle of maximal 60 degree with the common axis (55) of the abrasive head.

7. The abrasive head with inserted jet according to claim 1, wherein the abrasive head contains three liquid jets (21).

8. The abrasive head with inserted jet according to claim 1, wherein the abrasive head contains three separated infeed channels (25).

9. The abrasive head with inserted jet according to claim 1, wherein the abrasive head contains at least two gas and abrasive mixture (94) infeeds (28).

* * * * *